United States Patent Office 2,988,549
Patented June 13, 1961

2,988,549
METHOD OF MAKING 2,3-DIPHENYLDIBENZ [f,h] QUINOXALINE
John O. Hawthorne, Pittsburgh, and Edward L. Mihelic, Penn Hills Township, Allegheny County, Pa., assignors to United States Steel Corporation, a corporation of New Jersey
No Drawing. Filed May 11, 1960, Ser. No. 28,197
1 Claim. (Cl. 260—250)

This invention relates to a method for making 2,3-diphenyldibenz[f,h]quinoxaline and, in particular, to a simple direct method utilizing readily available starting materials. The product has utility for fluorescent marking ink as will be explained later.

Methods of making 2,3-diphenyldibenz[f,h]quinoxaline are known but those with which we are familiar require starting materials which are not commercial products. It is therefore the object of our invention to provide a method using only commercial chemicals, which can be easily carried out and will produce good yields of the product.

In general, our method comprises making a Schiff's base, 2,2'-bi(N-benzylidenebenzylamine), from 2,2'-biphenyldicarboxaldehyde and benzylamine, then dehydrogenating the base to give the specified quinoxaline derivative. The reactions involved may be represented thus:

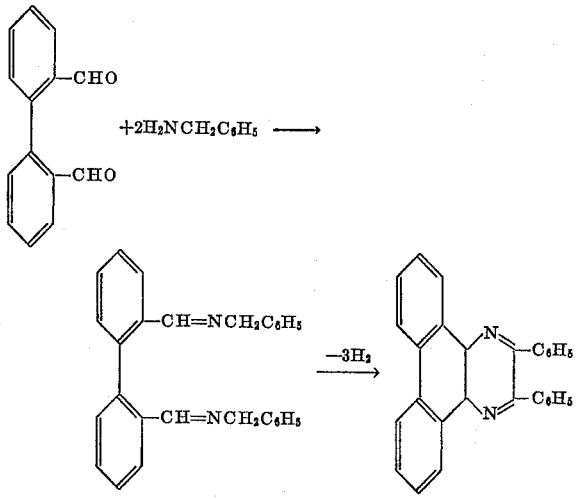

The dialdehyde may be readily obtained by the ozonolysis of phenanthrene.

A complete understanding of the invention may be obtained from the following detailed explanation of typical examples of the practice of our method.

Example I 2,2'-biphenyldicarboxaldehyde (5.0 grams), benzylamine (5.11 grams), and a catalyst, copper chromite (0.2 gram) in 95% ethanol (30 ml.), were heated in a 250 ml. autoclave under hydrogen (700 p.s.i. at room temperature) at 165° C. for 8 hours. On cooling and venting, crystals had formed. These, along with the catalyst were collected by filtration. The crystals were dissolved in boiling benzene (125 ml.) and the catalyst (reduced to the metals) was removed by filtration. The benzene was then concentrated until it was saturated at the boiling point. On cooling the solution, 1.4 grams of 2,3-diphenyldibenz[f,h]quinoxaline crystallized and was collected and dried. It had a melting point of 272–275° C. compared to the reported melting point of 272° C. The yield was 15.4%. On recrystallization from benzene, chloroform-methanol, and finally benzene, the compound melted at 274–275° C. The analysis agreed closely with that calculated for $C_{28}H_{18}N_2$:

|  | Percent Calculated | Percent Found |
|---|---|---|
| Carbon | 87.92 | 87.17 |
| Hydrogen | 4.74 | 4.62 |
| Nitrogen | 7.32 | 7.92 |

Example II

The above procedure was repeated using copper powder (0.5 gram) catalyst under nitrogen (150 p.s.i.), and the yield was substantially the same after a reaction time of 4 hours.

Example III

The above procedure was again repeated with a higher-boiling solvent at atmospheric pressure. The dialdehyde (5.0 grams) and benzylamine (5.11 grams) were refluxed in toluene (20 ml.) for half an hour. The water of reaction was collected in a Dean-Stark trap. The toluene was flash evaporated, leaving the Schiff's base as an oil. The oil was dissolved in p-dioxane and refluxed with copper chromite (0.5 gram) for 4 hours. No reaction appeared to occur, as evidenced by the fact that the catalyst remained unchanged in color. The p-dioxane was flash evaporated after filtering off the catalyst. The oil was dissolved in N,N-dimethylformamide (35 ml.) and refluxed with fresh catalyst (0.5 gram) for 2 hours. During this time, the catalyst was reduced to the free metals. The catalyst and solvent were removed. The oily residue was triturated with methanol (15 ml.). The insoluble portion, 1.5 grams (16.5% yield), melted at 260–265° C. On recrystallization from benzene, the product was 1.4 grams of 2,3-diphenyldibenz[f,h]quinoxaline (melting point 272–275° C.; 15.4% yield).

When the Schiff's base (prepared in Example III) was heated in nitrobenzene at 160° C. for 4 hours (without copper chromite) and then treated as above, only 0.4 gram of the crude quinoxaline was isolated (melting point 260–265° C.).

Example IV

When iron (II) sulfate heptahydrate (1.0 gram) was added to the reacting materials used in Example III with a reaction time of 3 hours, the yield was increased. The nitrobenzene was removed under reduced pressure (head temperature, 150° C.) and the oily residue triturated with methanol (100 ml.). The insoluble portion was dissolved in hot benzene-methanol and cooled. The crystals which separated weighed 2.5 grams and melted at 260–265° C. This yield was 27.5% compared to 16.5% from N,N-dimethylformamide and copper chromite, for product of the same melting point.

The amount of toluene used in forming the Schiff's base is not critical. The molecular ratio of benzylamine to 2,2'-biphenyldicarboxaldehyde should be at least 2 to 1. The amount of nitrobenzene per 5 grams of the dialdehyde should be at least 20 ml. The reaction temperature may vary within the range 140 to 170° C. Preferably it is about 155° C. The amount of ferrous salt should be 8–12% of the weight of the Schiff's base, preferably about 10%.

2,3-diphenyldibenz[f,h]quinoxaline possesses a blue fluorescence when irradiated by ultraviolet light but is colorless in visible light. Utility of the quinoxaline in formulating a fluorescent ink was demonstrated as follows: A solution (2 ml.) of the quinoxaline in xylene (0.15 gram/25 ml.) was added to label glaze (1.0 gram; Fisher Scientific Company, Catalog No. 11–880), which is itself nonfluorescent. This solution was then used as an ink to mark a cloth towel. The label glaze was used primarily to prevent undue spreading of the ink during application. After evaporation of the solvent, the cloth was viewed by the light emitted from an ultraviolet lamp. The lettering could be readily seen as a blue fluorescence. The cloth was then hand laundered with soap 20 times. The fluorescence did not appear to be diminished. Even after additional washing in running water at 57° C. for 2 hours, the fluorescence was undiminished.

It will be evident from the foregoing that our invention affords a simple method for making 2,3-diphenyldibenz[f,h]quinoxaline from starting materials which may be readily obtained.

Although we have disclosed herein the preferred embodiment of our invention, we intend to cover as well any change or modification therein which may be made without departing from the spirit and scope of the invention.

We claim:

A method of making 2,3-diphenyldibenz[f,h]quinoxaline which comprises reacting benzylamine and 2,2'-biphenyldicarboxaldehyde, heating the reaction product in a solvent selected from the group consisting of ethanol and dimethylformamide in the presence of a dehydrogenation agent selected from the group consisting of copper chromite, copper powder, nitrobenzene and nitrobenzene plus ferrous sulfate, to a temperature of from 140 to 170° C., and then recovering the product by removing the solvent.

No references cited.